(12) United States Patent
Lovaasen et al.

(10) Patent No.: US 10,511,762 B2
(45) Date of Patent: Dec. 17, 2019

(54) SYSTEM AND METHOD FOR AIRCRAFT CAMERA IMAGE ALIGNMENT

(71) Applicant: Rosemount Aerospace Inc., Burnsville, MN (US)

(72) Inventors: Eric Lovaasen, Chaska, MN (US); Travis W. Fleck, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/332,595

(22) Filed: Oct. 24, 2016

(65) Prior Publication Data

US 2018/0115699 A1    Apr. 26, 2018

(51) Int. Cl.

| | |
|---|---|
| *H04N 5/232* | (2006.01) |
| *B64D 47/08* | (2006.01) |
| *H04N 5/247* | (2006.01) |
| *B64D 47/00* | (2006.01) |
| *G06F 3/00* | (2006.01) |
| *G08G 5/00* | (2006.01) |
| *G08G 5/06* | (2006.01) |
| *H04N 7/18* | (2006.01) |

(52) U.S. Cl.
CPC ......... *H04N 5/23216* (2013.01); *B64D 47/00* (2013.01); *B64D 47/08* (2013.01); *G06F 3/00* (2013.01); *G08G 5/0021* (2013.01); *G08G 5/065* (2013.01); *H04N 5/23293* (2013.01); *H04N 5/247* (2013.01); *H04N 7/18* (2013.01)

(58) Field of Classification Search
CPC ....... G06T 7/002; G06T 7/0048; G06T 7/408; H04N 5/23216; H04N 5/23293; H04N 5/247; H04N 7/18; B64D 47/00; B64D 47/08; G06F 3/00; G08G 5/0021; G08G 5/065

USPC .................................................. 348/46, 144
See application file for complete search history.

(56) References Cited

U.S. PATENT DOCUMENTS

| | | |
|---|---|---|
| 4,992,866 A | 2/1991 | Morgan |
| 6,405,975 B1 | 6/2002 | Sankrithi et al. |
| 6,928,363 B2 | 8/2005 | Sankrithi |

(Continued)

FOREIGN PATENT DOCUMENTS

JP    2009117971 A    5/2009

OTHER PUBLICATIONS

Ground maneuvering camera system (GMCS), Securaplane, Jan. 2014, 2 pages.

(Continued)

*Primary Examiner* — Ayman A Abaza
(74) *Attorney, Agent, or Firm* — Kinney & Lange, P.A.

(57) ABSTRACT

An alignment system for images produced by cameras externally mounted on an aircraft includes a visual display positioned at a first location in the aircraft (such as a flight deck) and an alignment device positioned at a second location in the aircraft (such as an electronics bay). The visual display displays images provided by the cameras. The alignment device includes a user interface, which includes user inputs for selecting one of the cameras and for aligning an image from the camera selected on the visual display, a depiction of an aircraft, and indicators positioned adjacent the depiction. Each of the indicators represents selection of one of the cameras for aligning the image from that camera on the visual display.

12 Claims, 4 Drawing Sheets

(56) References Cited

U.S. PATENT DOCUMENTS

| | | | |
|---|---|---|---|
| 7,302,323 B2 | 11/2007 | Anderson et al. | |
| 9,047,771 B1 | 6/2015 | Thoreen et al. | |
| 9,091,762 B2 | 7/2015 | Knight | |
| 2012/0224058 A1* | 9/2012 | Benning | B64D 47/08 |
| | | | 348/144 |
| 2012/0229645 A1 | 9/2012 | Yamada | |
| 2013/0110323 A1* | 5/2013 | Knight | G01S 13/93 |
| | | | 701/3 |
| 2013/0147958 A1 | 6/2013 | Mitsuta et al. | |
| 2013/0321176 A1 | 12/2013 | Vasek et al. | |
| 2013/0321192 A1* | 12/2013 | Starr | G01S 7/04 |
| | | | 342/29 |
| 2013/0329052 A1 | 12/2013 | Chew | |
| 2015/0106005 A1 | 4/2015 | Wischmeyer | |
| 2016/0005319 A1 | 1/2016 | Cros et al. | |
| 2017/0251501 A1* | 8/2017 | Batsakes | H04L 67/12 |

OTHER PUBLICATIONS

Extended European Search Report for EP Application No. 17197560.0, dated Mar. 23, 2018, 11 Pages.

\* cited by examiner

SYSTEM AND METHOD FOR AIRCRAFT CAMERA IMAGE ALIGNMENT

BACKGROUND

The present invention relates to aircraft performance and operability systems, and in particular, to ground maneuver camera systems.

Ground maneuver camera systems are used by pilots of large aircraft to assist with maneuvering the aircraft on the ground. Cameras provide views of landing gear areas, the areas around and including the wheels of the aircraft. The camera views supply the pilot with additional information regarding the position of the aircraft on the runway and taxiway.

When cameras are installed on aircraft, they may not be perfectly centered. In that case, the image provided by the camera is also off-center. As a result, the image needs to be aligned to ensure that images are consistent or look the same from aircraft to aircraft. A more universal system for aligning images of a ground maneuver camera system is needed.

SUMMARY

An alignment system for images produced by cameras externally mounted on an aircraft includes cameras on an aircraft, a visual display positioned at a first location in the aircraft, and an alignment device positioned at a second location in the aircraft. The visual display displays images provided by the cameras. The alignment device includes a user interface, which includes user inputs for selecting one of the cameras and for aligning an image from the camera selected on the visual display, a depiction of an aircraft, and indicators positioned adjacent the depiction. Each of the indicators represents selection of one of the cameras for aligning the image from that camera on the visual display.

An alignment device includes a housing with a panel, a depiction of an aircraft on the panel, a plurality of indicators positioned adjacent the depiction on the panel, a camera selection button on the panel, a plurality of positioning buttons on the panel, and a processor adjacent the panel for pan and crop adjustment.

A method of operating an alignment system for images produced by ground maneuver cameras externally mounted on an aircraft includes selecting for alignment a first image from a first camera of the ground maneuver cameras and aligning the first image. Selecting for alignment a first image from a first camera includes sending a camera selection input to an alignment device using a camera selection button and illuminating a first indicator positioned adjacent a depiction of an aircraft, wherein the first indicator is positioned to correspond to the location of the first camera to indicate the selection of the first camera on the visual display. Aligning the first image includes displaying the first image on the visual display, sending pan and crop adjustment inputs to the alignment device using one of the positioning buttons, and adjusting, with the alignment device, the first image on the visual display based upon the pan and crop adjustment inputs.

DETAILED DESCRIPTION

In general, the present disclosure is an alignment device that uses a depiction of an aircraft and a plurality of indicators positioned adjacent the depiction to indicate which image of an aircraft's ground maneuver camera system has been selected on the visual display for alignment. The present disclosure simplifies and improves communication and operability of the alignment device, which is located in a different area of the aircraft than the visual display.

Figure 1A:
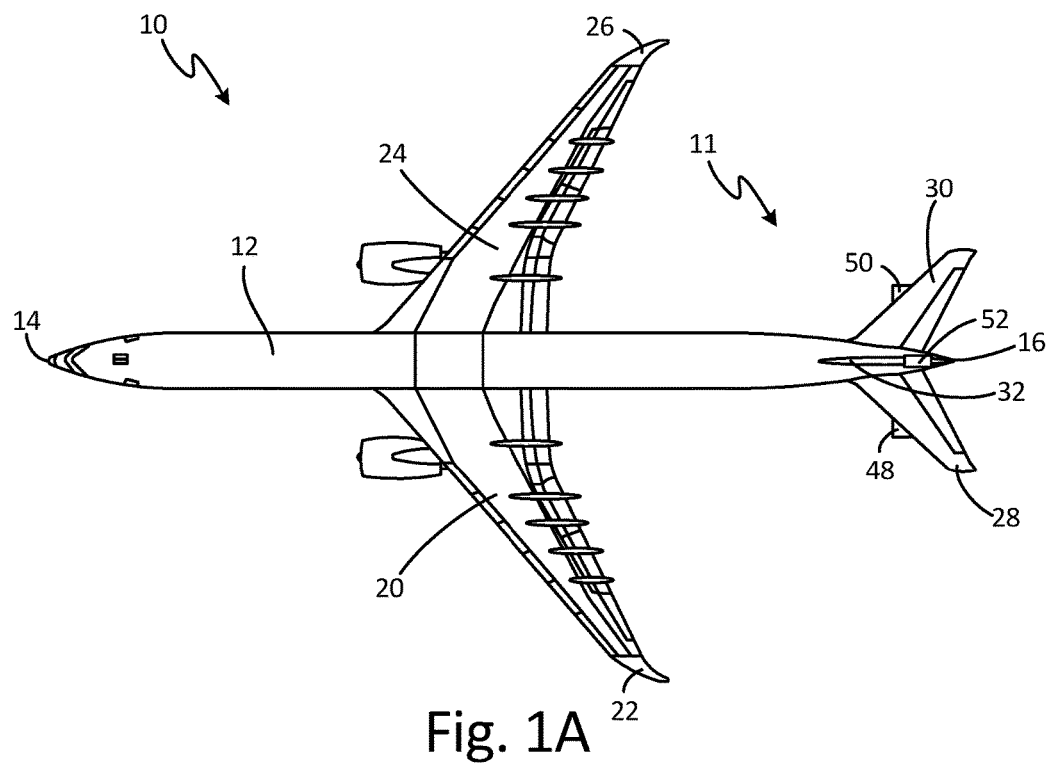
FIG. 1A is a top view of an aircraft including a ground maneuver camera system.
Figure 1B:
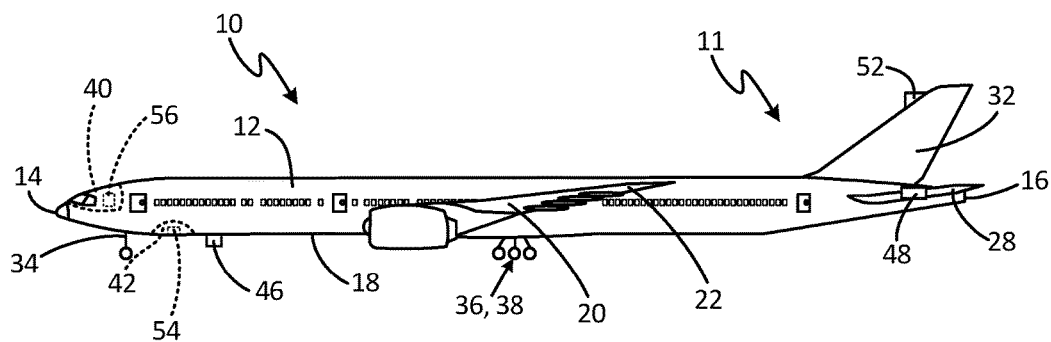
FIG. 1B is a side view of the aircraft including the ground maneuver camera system.

FIGS. 1A and 1B show aircraft 10 and ground maneuver camera system 11. FIG. 1A is a top view of aircraft 10 including ground maneuver camera system 11. FIG. 1B is a side view of aircraft 10 including ground maneuver camera system 11. Aircraft 10 includes fuselage 12, nose 14, tail 16, belly 18, left wing 20, left wingtip 22, right wing 24, right wingtip 26, left horizontal stabilizer 28, right horizontal stabilizer 30, vertical stabilizer 32, nose landing gear 34, left main landing gear 36, right main landing gear 38, flight deck 40, and electronics bay 42. Ground maneuver camera system 11 includes first camera 46, second camera 48, third camera 50, fourth camera 52, alignment device 54, and visual display 56.

Fuselage 12 forms the main body of aircraft 10. Nose 14 is at a front end of fuselage 12 and tail 16 is at a rear end of fuselage 12. Belly 18 is at a bottom of fuselage 12 between nose 14 and tail 16. Left wing 20 has a first end attached to a first side of fuselage 12 between nose 14 and tail 16. Left wingtip 22 is at a second end of left wing 20. Right wing 24 has a first end attached to a second side of fuselage 12 between nose 14 and tail 16. Right wingtip 26 is at a second end of right wing 24. Left horizontal stabilizer 28 is attached to the first side of fuselage 12 adjacent to tail 16. Right horizontal stabilizer 30 is attached to the second side of fuselage 12 adjacent tail 16. Vertical stabilizer 32 is attached to a top of fuselage 12 adjacent to tail 16 and between left horizontal stabilizer 28 and right horizontal stabilizer 30. Nose landing gear 34 is connected to a bottom of fuselage 12 near nose 14. Left main landing gear 36 and right main landing gear 38 are positioned next to one another and connected to a bottom of fuselage 12 between nose 14 and tail 16. Left main landing gear 36 is positioned on a first side of aircraft 10 and right main landing gear 38 is positioned on a second side of aircraft 10. Flight deck 40 is located inside fuselage 12 near nose 14. Electronics bay 42 is located inside fuselage 12 near nose 14 and under flight deck 40. Electronics bay 42 may also be referred to as an avionics bay.

Ground maneuver camera system 11 has a first camera 46 positioned on belly 18 of aircraft 10. First camera 46 provides a view of nose landing gear 34. Second camera 48 of ground maneuver camera system 44 is positioned on left horizontal stabilizer 28 of aircraft 10. Second camera 48 provides a view of left main landing gear 36. Third camera 50 of ground maneuver camera system 44 is positioned on right horizontal stabilizer 30 of aircraft 10. Third camera 50 provides a view of right main landing gear 38. Fourth camera 52 of ground maneuver camera system 11 is positioned on vertical stabilizer 32 of aircraft 10. Fourth camera 52 provides a view of a top of aircraft 10 from left wingtip 22 to right wingtip 26. In alternate embodiments, cameras 46, 48, 50, and 52 can be positioned on other locations of aircraft 10, such as wings 20 and 24 or wingtips 22 and 26. Further, cameras 46, 48, 50, and 52 can alternatively be positioned to provide views of other locations of and around aircraft 10, such as straight down from belly 18, backwards from wings 20 or 24, backwards from horizontal stabilizers 28 and 30, or backwards from vertical stabilizer 32. In further alternate embodiments, the number of cameras positioned on aircraft 10 can be less than four or greater than four. Alignment device 54 is located at electronics bay 42 of aircraft 10. In alternate embodiments, alignment device 54 can be located in any area of aircraft 10. Visual display 56 is located at flight deck 40 of aircraft 10.

First camera 46, second camera 48, third camera 50, and fourth camera 52 send video input to alignment device 54. Alignment device 54 generates images from the video input. Alignment device 54 then sends the images to be displayed on visual display 56 at flight deck 40 of aircraft 10. The images on visual display 56 supply a pilot of aircraft 10 who is positioned at flight deck 40 with additional information regarding the position of aircraft 10, particularly to aid in maneuvering aircraft 10 along a runway or taxiway.

Figure 2:
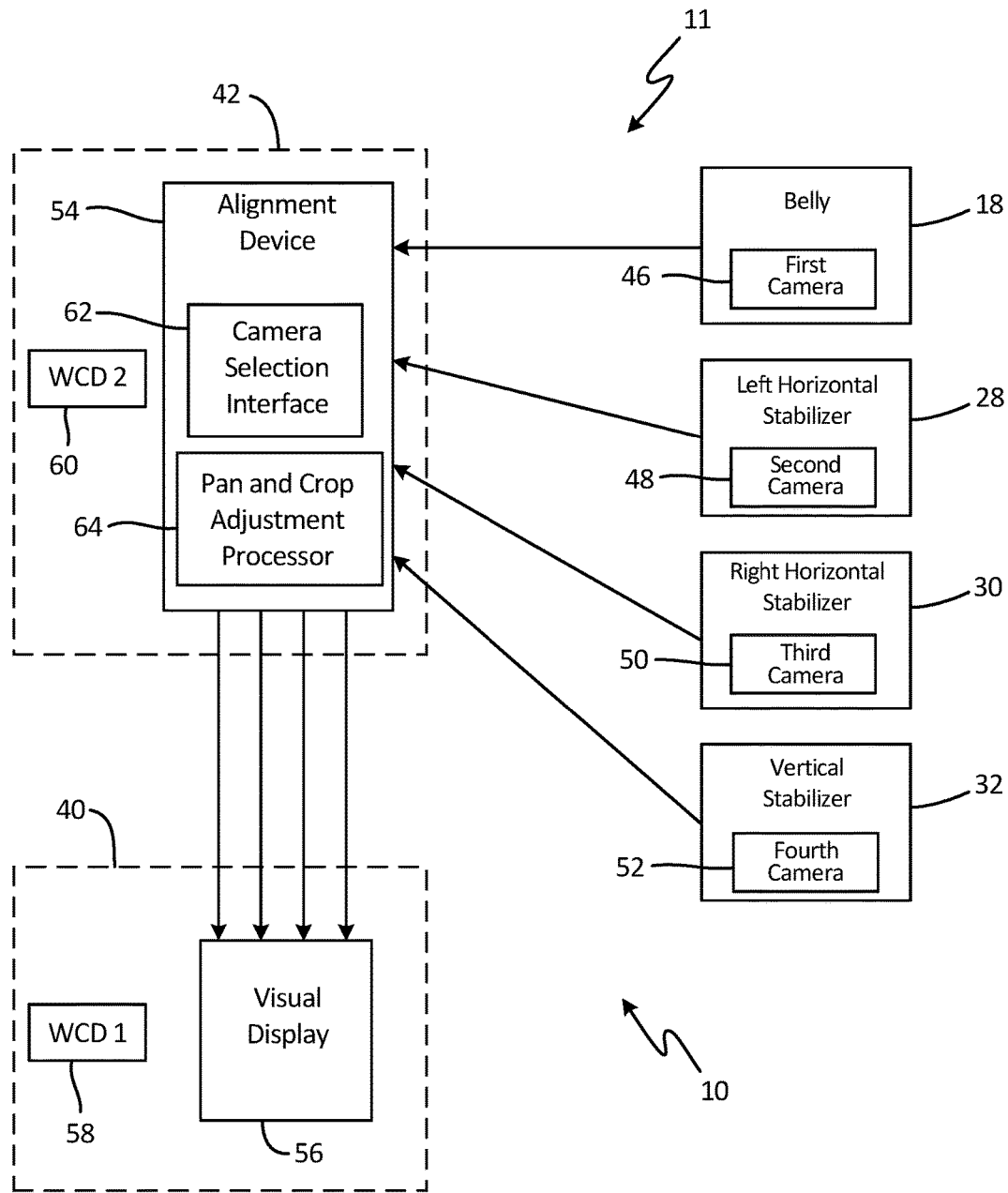
FIG. 2 is a block diagram illustrating the ground maneuver camera system, including aircraft mounted cameras, an alignment device in an electronics bay area, and a visual display in a flight deck area.

FIG. 2 is a block diagram illustrating ground maneuver camera system 11, including aircraft mounted cameras 46, 48, 50, and 52, alignment device 54 in electronics bay 42, and visual display 56 in flight deck 40. Ground maneuver camera system 11 includes first camera 46, second camera 48, third camera 50, fourth camera 52, alignment device 54, visual display 56, first wireless communication device 58 and second wireless communication device 60. Alignment device 54 includes camera selection interface 62 and pan and crop adjustment processor 64.

As stated above, first camera 46 is positioned on belly 18 of aircraft 10, second camera 48 is positioned on left horizontal stabilizer 28 of aircraft 10, third camera 50 is positioned on right horizontal stabilizer 30 of aircraft 10, and fourth camera 52 is positioned on vertical stabilizer 32 of aircraft 10. Alignment device 54 and second wireless communication device 60 are located at electronics bay 42 of aircraft 10. Visual display 56 and first wireless communication device 58 are located at flight deck 40 of aircraft 10. Camera selection interface 62 and pan and crop adjustment processor 64 are located adjacent a front panel of alignment device 54.

First camera 46, second camera 48, third camera 50, and fourth camera 52 ultimately provide images to visual display 56 by sending video input to alignment device 54. Alignment device 54 receives the video input as oversized images, crops the oversized images, and sends the cropped images to visual display 56 to be displayed as images. Alignment device 54 is also configured to align the images on visual display 56. Specifically, camera selection interface 62 is configured to receive camera selection inputs. In response to the camera selection inputs, alignment device 54 selects one of first camera 46, second camera 48, third camera 50, or fourth camera 52 for aligning the oversized image from that camera on visual display 56. Next, pan and crop adjustment processor 64 is configured to receive pan and crop adjustment input for the oversized image from the selected camera to align the selected image on visual display 56. Alignment device 54 aligns the selected image by panning and cropping the oversized image according to the pan and crop adjustment input. First wireless communication device 58 at flight deck 40 and second wireless communication device 60 at electronics bay 42 are used to provide alignment guidance, such as by communicating the alignment needs of the images on visual display 56. In addition to panning and cropping, alignment device 54 may also scale the image. Finally, alignment device 54 sends the cropped image to visual display 56 to display the aligned image. The alignment process yields aligned images on visual display 56. Aligned images ensure that images on visual display 56 are consistent and look the same from aircraft to aircraft.

Figure 3:
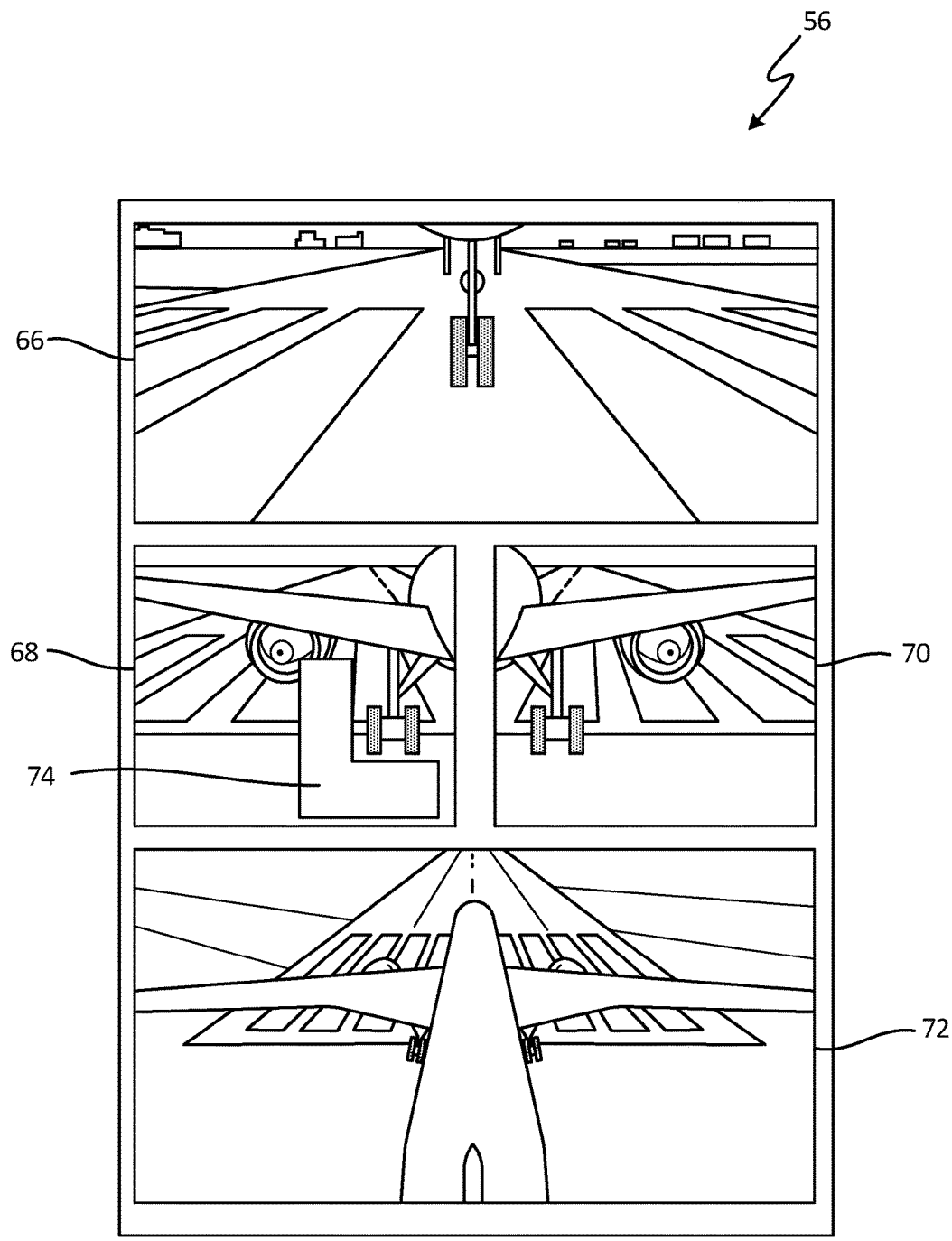
FIG. 3 is a front plan view of the visual display showing a marker.

FIG. 3 is a front plan view of visual display 56 showing marker 74. Visual display 56 includes first image 66, second image 68, third image 70, fourth image 72, and marker 74. First image 66, second image 68, third image 70, and fourth image 72 are all adjacent to each other on visual display 56. Marker 74 is located on one of first image 66, second image 68, third image 70, or fourth image 72. Marker 74 may be L-shaped, T-shaped, or another shape depending on the alignment needs of the image on which marker 74 appears.

As stated above, first image 66 is a view of nose landing gear 34, second image 68 is a view of left main landing gear 36, third image 70 is a view of right main landing gear 38, and fourth image 72 is a view of a top of aircraft 10 from left wingtip 22 to right wingtip 26. Images 66, 68, 70, and 72 on visual display 56 may be monitored by a person on flight deck 40 during alignment. Marker 74 indicates to the person on flight deck 40 which of images 66, 68, 70, and 72 on visual display 56 is being aligned by alignment device 54 in electronics bay 42. More specifically, marker 74 is enabled by camera selection button 90. Marker 74 appears on or overlays the image that has been selected for alignment via camera selection interface 62. Marker 74 is positioned depending on the selected image. The location of marker 74 varies among first image 66, second image 68, third image 70, and fourth image 72 to account for the alignment needs of the different images. At the same time, marker 74 is always positioned in the same locations on first images 66, second images 68, third images 70, and fourth images 72. As such, marker 74 provides a location for alignment guidance that can be communicated by a person in flight deck 40 to a person in electronics bay 42 using first wireless communication device 58 and second wireless communication device 60, respectively. The selected image can be moved using alignment device 54 until it appropriately lines up with marker 74 on visual display 56, such as until the wheels of second image 68 abut the side and bottom of the notch in L-shaped marker 74. Marker 74 is only present on visual display 56 during the alignment process.

Therefore, a person on flight deck 40 can identify the selected image on visual display 56 by the presence of marker 74, watch the image change as a result of pan and crop adjustment input received at alignment device 54, and give instructions to the person in electronics bay 42 controlling the pan and crop adjustment input based on the position of marker 74 relative to the selected image to bring the selected image into alignment.

Aligning images 66, 68, 70, and 72 on visual display 56 using marker 74 aids in ensuring that first image 66, second image 68, third image 70, and fourth image 72 are consistent from aircraft to aircraft.

Figure 4:
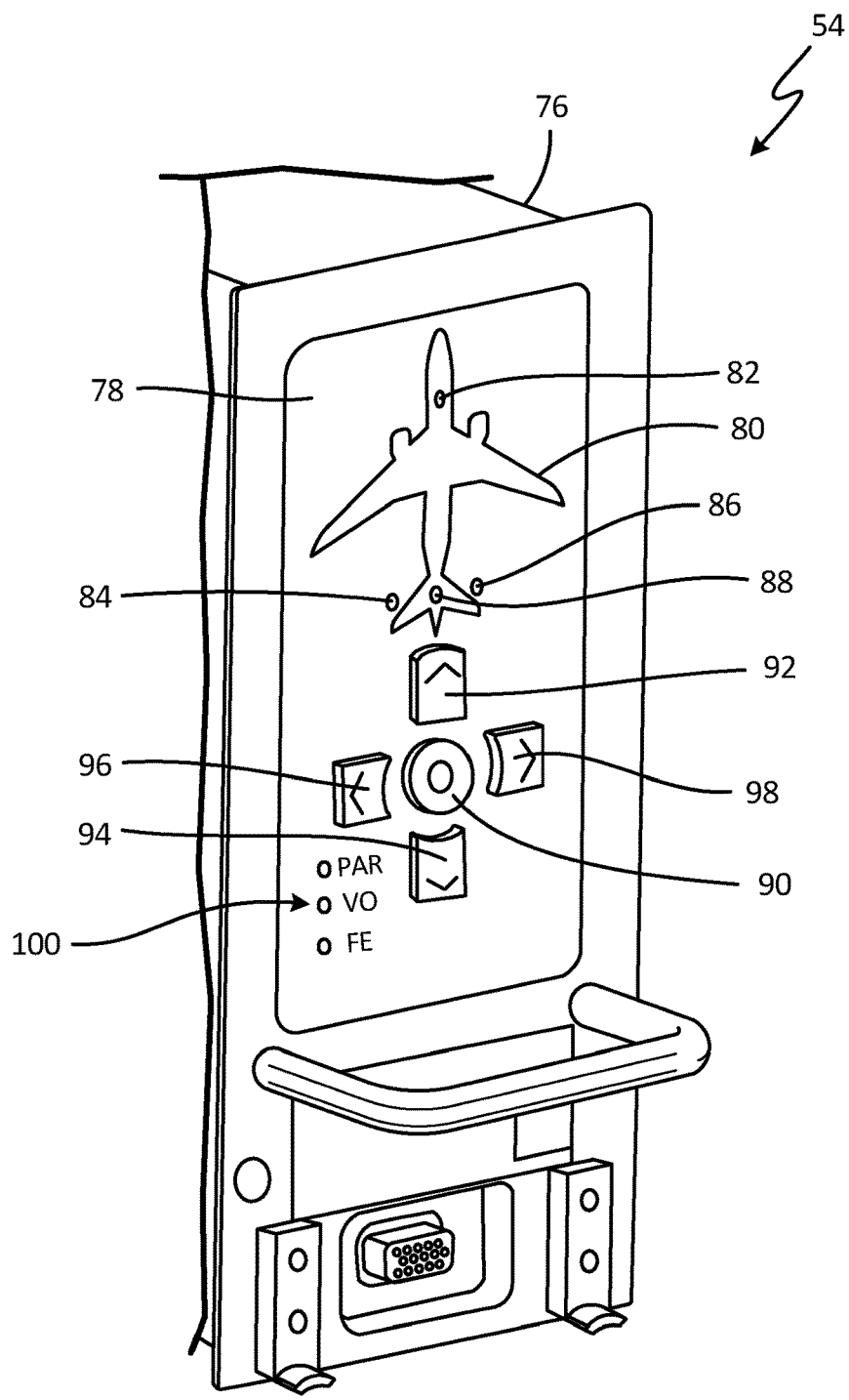
FIG. 4 is a perspective view of the alignment device of FIG. 2.

FIG. 4 is a perspective view of alignment device 54 of FIG. 2. Alignment device 54 is a rack mounted module that includes housing 76, panel 78, depiction 80, first indicator 82, second indicator 84, third indicator 86, fourth indicator 88, camera selection button 90, up positioning button 92, down positioning button 94, left positioning button 96, right positioning button 98, and status indicators 100.

Housing 76 has panel 78 located on a front of housing 76. Depiction 80 is displayed on panel 78. First indicator 82, second indicator 84, third indicator 86, and fourth indicator 88 are positioned adjacent to depiction 80. Depiction 80 is a depiction of an aircraft. In this embodiment, depiction 80 shows aircraft 10 in the form of a silhouette. In alternate embodiments, depiction 80 may be an outline of an aircraft or an image of an aircraft, including an image of aircraft 10. Additionally, in this embodiment, indicators 82, 84, 86, and 88 are LEDs. In alternate embodiments, indicators 82, 84, 86, and 88 are lamps, fiber optic lights, or any other suitable illumination source. First indicator 82 is positioned adjacent depiction 80 to correspond to the location of first camera 46 of aircraft 10. Second indicator 84 is positioned adjacent depiction 80 to correspond to the location of second camera 48 of aircraft 10. Third indicator 86 is positioned adjacent depiction 80 to correspond to the location of third camera 50 of aircraft 10. Fourth indicator 88 is positioned adjacent depiction 80 to correspond to the location of fourth camera 52 of aircraft 10. Thus, first indicator 82 is positioned adjacent depiction 80 to correspond to belly 18, second indicator 84 is positioned adjacent depiction 80 to correspond to left horizontal stabilizer 28, third indicator 86 is positioned adjacent depiction 80 to correspond to right horizontal stabilizer 30, and fourth indicator 88 is positioned adjacent depiction 80 to correspond to vertical stabilizer 32. Camera selection button 90 is positioned on panel 78. Up positioning button 92, down positioning button 94, left positioning button 96, and right positioning button 98 are also positioned on panel 78 adjacent to camera selection button 90. Positioning buttons 92, 94, 96, and 98 may include arrows to indicate which direction they pan the oversized image. Further, status indicators 100 are positioned on panel 78.

Panel 78 is a user interface of alignment device 54. Camera selection button 90 acts as a user input for camera selection interface 62. Camera selection button 90 is configured to input camera selection information. As such, first camera 46, second camera 48, third camera 50, or fourth camera 52 can be selected for aligning the image from that camera on visual display 56. Up positioning button 92, down positioning button 94, left positioning button 96, and right positioning button 98 act as user inputs for pan and crop adjustment processor 64. Positioning buttons 92, 94, 96, and 98 are configured to input pan and crop adjustment information. As such, the image from the selected camera can be aligned on visual display 56. Furthermore, pan and crop adjustment input may be stored by alignment device 54. Status indicators 100 show the status of alignment device 54, such as whether it has electrical power.

First indicator 82 is configured to illuminate in response to camera selection input when first camera 46 has been selected using camera selection button 90 to align first image 66. Second indicator 84 is configured to illuminate in response to camera selection input when second camera 48 has been selected using camera selection button 90 to align second image 68. Third indicator 86 is configured to illuminate in response to camera selection input when third camera 50 has been selected using camera selection button 90 to align third image 70. Fourth indicator 88 is configured to illuminate in response to camera selection input when fourth camera 52 has been selected using camera selection button 90 to align fourth image 72. Therefore, first indicator 82, second indicator 84, third indicator 86, and fourth indicator 88, positioned around depiction 80, indicate which of first camera 46, second camera 48, third camera 50, or fourth camera 52 is selected for aligning first image 66, second image 68, third image 70, or fourth image 72, respectively.

Alignment device 54 offers visual feedback regarding which camera is actively being aligned, making it easier to use. Visual feedback is more intuitive, easier to understand, and more universal than text. For example, a user need not know specific terminology or a specific language in order to operate alignment device 54. Further, alignment device 54 eliminates the risk of mechanical failure present in other visual management units that use knobs to select cameras. Additionally, alignment device 54 is capable of being used in low light conditions when indicators 82, 84, 86, and 88 are LEDs or any other illumination source because reading is not required for operation. Alignment device 54 is also capable of being used when panel 78 is limited in area because visual feedback can require less space than text. Alternatively, when panel 78 is limited in area, visual feedback is easier to read and understand than text that has been made very small or abbreviated to fit within the space constraints.

Ground maneuver camera system 11 uses cameras 46, 48, 50, and 52 positioned on aircraft 10 to send video input to alignment device 54 in electronics bay 42. Alignment device 54 receives oversized images from the video input, crops the images, and sends the images to be displayed on visual display 56 in flight deck 40 as images 66, 68, 70, 72. A person in flight deck 40 monitors images 66, 68, 70, and 72 and determines which images require alignment. The person in flight deck 40 communicates alignment needs to a person in electronics bay 42 using first wireless communication device 58. The person in electronics bay 42 receives communication using second wireless communication device 60 and selects the camera for aligning the oversized image from that camera using camera selection interface 60 of alignment device 54. More specifically, the person uses camera selection button 90 to input camera selection information. One of indicators 82, 84, 86, and 88 positioned around depiction 80 illuminates to indicate the selected camera to the person in electronics bay 42. At flight deck 40, marker 74 appears on the selected image. The person at flight deck 40 gives instructions to the person in electronics bay 42 regarding pan and crop adjustment based on the position of the selected image in relation to marker 74. The person in electronics bay 42 uses positioning buttons 92, 94, 96, and 98 to input pan and crop adjustment information. In response, alignment device 54 pans the oversized image from the selected camera, crops it, and sends the cropped image to be displayed as an aligned image on visual display 56. As a result, a pilot in flight deck 40 can view aligned images of nose landing gear 34, left main landing gear 36, right main landing gear 38, and a top of aircraft 10 from left wingtip 22 to right wingtip 26 to assist in maneuvering aircraft 10 on the ground.

Discussion of Possible Embodiments

The following are non-exclusive descriptions of possible embodiments of the present invention.

An alignment system for images produced by cameras externally mounted on an aircraft includes a plurality of cameras on an aircraft positioned to provide images of the aircraft; a visual display positioned at a first location in the aircraft, wherein the visual display displays a plurality of images provided by the plurality of cameras; and an alignment device positioned at a second location in the aircraft, the alignment device including a user interface comprising:

user inputs for selecting one of the plurality of cameras and for aligning an image from the camera selected on the visual display; a depiction of an aircraft; and a plurality of indications positioned adjacent the depiction, each of the plurality of indicators representing selection of one of the cameras for aligning the image from that camera on the visual display.

The alignment system of the preceding paragraph can optionally include, additionally and/or alternatively, any one or more of the following features, configurations and/or additional components:

The first location is a flight deck of the aircraft.

The second location is an electronics bay of the aircraft.

The depiction of an aircraft is a silhouette of an aircraft.

The plurality of indicators positioned adjacent the depiction is a plurality of LEDs.

The user inputs include a camera selection button configured to receive image selection input for the alignment device.

The user inputs include a plurality of positioning buttons.

The positioning buttons are configured to receive pan and crop adjustment inputs for a selected image for the alignment device.

The plurality of cameras on the aircraft includes a first camera positioned on the aircraft to provide a first image of a first field of view, a second camera positioned on the aircraft to provide a second image of a second field of view, a third camera positioned on the aircraft to provide a third image of a third field of view, and a fourth camera positioned on the aircraft to provide a fourth image of a fourth field of view.

The first image is a view of a nose gear of the aircraft, the second image is a view of a left main gear of the aircraft, the third image is a view of a right main gear of the aircraft, and the fourth image is a view of a first wingtip of the aircraft and a second wingtip of the aircraft.

The plurality of indicators includes a first LED that indicates selection of the first camera for aligning the first image, a second LED that indicates selection of the second camera for aligning the second image, a third LED that indicates selection of the third camera for aligning the third image, and a fourth LED that indicates selection of the fourth camera for aligning the fourth image.

An alignment device includes a housing with a panel; a depiction of an aircraft on the panel; a plurality of indicators positioned adjacent the depiction on the panel; a camera selection button on the panel; a plurality of positioning buttons on the panel; and a processor adjacent the panel for pan and crop adjustment.

The alignment device of the preceding paragraph can optionally include, additionally and/or alternatively, any one or more of the following features, configurations and/or additional components:

The plurality of indicators positioned adjacent the depiction is a plurality of LEDs configured to indicate the selection of one of a plurality of cameras for aligning an image from that camera based on a location of that camera on an aircraft.

The camera selection button is configured to receive image selection input.

The plurality of indicators positioned adjacent the depiction is a plurality of LEDs configured to illuminate in response to pressing the camera selection button.

The plurality of positioning buttons are configured to align an image.

The plurality of positioning buttons are configured to receive pan and crop adjustment inputs for a selected image.

A method of operating an alignment system for images produced by a plurality of ground maneuver cameras externally mounted on an aircraft includes selecting for alignment a first image from a first camera of the plurality of ground maneuver cameras, the selecting comprising: sending a camera selection input to an alignment device using a camera selection button; and illuminating a first indicator positioned adjacent a depiction of an aircraft, wherein the first indicator is positioned to correspond to the location of the first camera to indicate the selection of the first camera on the visual display; and aligning the first image, the aligning comprising: displaying the first image on the visual display; sending pan and crop adjustment inputs to the alignment device using one of a plurality of positioning buttons; and adjusting, with the alignment device, the first image on the visual display based upon the pan and crop adjustment inputs.

The method of the preceding paragraph can optionally include, additionally and/or alternatively, any one or more of the following features, configurations and/or additional components:

Selecting for alignment a second image from a second camera of the plurality of ground maneuver cameras, the selecting comprising: sending a camera selection input to an alignment device using a camera selection button; and illuminating a second indicator positioned adjacent a depiction of an aircraft, wherein the second indicator is positioned to correspond to the location of the second camera to indicate the selection of the second camera on the visual display; and aligning the second image, the aligning comprising: displaying the second image on the visual display; sending pan and crop adjustment inputs to the alignment device using one of a plurality of positioning buttons; and adjusting, with the alignment device, the second image on the visual display based upon the pan and crop adjustment inputs.

The visual display is positioned in a flight deck area of the aircraft and the alignment device is positioned in an electronics bay area of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An alignment system for images produced by cameras externally mounted on an aircraft, the alignment system comprising:
   a plurality of cameras on the aircraft positioned to provide images of the aircraft;
   a visual display positioned at a flight deck of the aircraft, wherein the visual display displays a plurality of images provided by the plurality of cameras; and
   an alignment device positioned at an electronics bay of the aircraft, the alignment device including a user interface comprising:
   user inputs for selecting one of the plurality of cameras at the electronics bay and for aligning an image from the camera selected on the visual display at the flight deck, the user inputs including:

a camera selection button; and
a plurality of positioning buttons configured to receive pan and crop adjustment inputs for a selected image for the alignment device;
a depiction of the aircraft; and
a plurality of indicators positioned adjacent the depiction, each of the plurality of indicators representing selection of one of the cameras at the electronics bay for aligning the image from that camera on the visual display at the flight deck;
a camera selection interface configured to select one of the plurality of cameras as a source of a selected image based upon input from the camera selection button; and
a pan and crop adjustment processor configured to align a selected image based upon pan and crop adjustment inputs from the positioning buttons.

2. The alignment system of claim 1, wherein the depiction of the aircraft is a silhouette of the aircraft.

3. The alignment system of claim 1, wherein the plurality of indicators positioned adjacent the depiction is a plurality of LEDs.

4. The alignment system of claim 1, wherein the plurality of cameras on the aircraft includes a first camera positioned on the aircraft to provide a first image of a first field of view, a second camera positioned on the aircraft to provide a second image of a second field of view, a third camera positioned on the aircraft to provide a third image of a third field of view, and a fourth camera positioned on the aircraft to provide a fourth image of a fourth field of view.

5. The alignment system of claim 4, wherein the first image is a view of a nose gear of the aircraft, the second image is a view of a left main gear of the aircraft, the third image is a view of a right main gear of the aircraft, and the fourth image is a view of a first wingtip of the aircraft and a second wingtip of the aircraft.

6. The alignment system of claim 4, wherein the plurality of indicators includes a first LED that indicates selection of the first camera for aligning the first image, a second LED that indicates selection of the second camera for aligning the second image, a third LED that indicates selection of the third camera for aligning the third image, and a fourth LED that indicates selection of the fourth camera for aligning the fourth image.

7. An alignment device comprising:
a housing with a panel;
a depiction of an aircraft on the panel;
a plurality of indicators positioned adjacent the depiction on the panel, each of the indicators representing a location of one of a plurality of cameras on an aircraft and representing selection of one of the cameras at an electronics bay for aligning the image from that camera on a visual display at a flight deck;
a camera selection button on the panel, the camera selection button being configured to receive image selection input at the electronics bay;
a camera selection interface configured to select one of the plurality of cameras as a source of a selected image based upon input from the camera selection button;
a plurality of positioning buttons on the panel, the plurality of positioning buttons being configured to receive pan and crop adjustment inputs for the selected image; and
a processor configured to align the selected image based upon pan and crop adjustment inputs from the positioning buttons.

8. The alignment device of claim 7, wherein the plurality of indicators positioned adjacent the depiction is a plurality of LEDs configured to indicate the selection of one of a plurality of cameras for aligning an image from that camera based on a location of that camera on an aircraft.

9. The alignment device of claim 7, wherein the plurality of indicators positioned adjacent the depiction is a plurality of LEDs configured to illuminate in response to pressing the camera selection button.

10. The alignment device of claim 7, wherein the plurality of positioning buttons are configured to align an image.

11. A method of operating an alignment system for images produced by a plurality of ground maneuver cameras externally mounted on an aircraft, the alignment system including a visual display positioned in a flight deck area of the aircraft and an alignment device positioned in an electronics bay area of the aircraft, the method comprising:
displaying images from the plurality of ground maneuver cameras on the visual display in the flight deck area;
selecting for alignment, using the alignment device in the electronics bay area of the aircraft, a first image from a first camera of the plurality of ground maneuver cameras, the selecting comprising:
sending a first camera selection input to a camera selection interface of the alignment device using a camera selection button on a panel of the alignment device in the electronics bay area to select the first image for alignment; and
illuminating a first indicator on the panel of the alignment device positioned adjacent a depiction of the aircraft on the panel of the alignment device in the electronics bay area, wherein the first indicator is positioned to correspond to the location of the first camera to indicate the selection of the first camera on the visual display in the flight deck area; and
aligning the first image using the alignment device, the aligning comprising:
sending pan and crop adjustment inputs to a pan and crop adjustment processor of the alignment device using a plurality of positioning buttons on the panel of the alignment device at the electronics bay area; and
adjusting, with the pan and crop adjustment processor at the electronics bay area, the first image displayed on the visual display at the flight deck area based upon the pan and crop adjustment inputs.

12. The method of claim 11, and further comprising:
selecting for alignment, using the alignment device, a second image from a second camera of the plurality of ground maneuver cameras, the selecting comprising:
sending a second camera selection input to the camera selection interface of the alignment device using the camera selection button on the panel of the alignment device to select the second image for alignment; and
illuminating a second indicator on the panel of the alignment device positioned adjacent the depiction of the aircraft, wherein the second indicator is positioned to correspond to the location of the second camera to indicate the selection of the second camera on the visual display; and
aligning the second image using the alignment device, the aligning comprising:
sending pan and crop adjustment inputs to the pan and crop adjustment processor of the alignment device using the plurality of positioning buttons; and adjusting, with the pan and crop adjustment processor, the second image displayed on the visual display based upon the pan and crop adjustment inputs.

\* \* \* \* \*